(12) United States Patent
Ge

(10) Patent No.: US 6,369,867 B1
(45) Date of Patent: Apr. 9, 2002

(54) RIVETED LIQUID CRYSTAL DISPLAY COMPRISING AT LEAST ONE PLASTIC RIVET FORMED BY LASER DRILLING THROUGH A PAIR OF PLASTIC PLATES

(75) Inventor: Shichao Ge, San Jose, CA (US)

(73) Assignee: GL Displays, Inc., Saratoga, CA (US)

( * ) Notice: Subject to any disclaimer, the term of this patent is extended or adjusted under 35 U.S.C. 154(b) by 0 days.

(21) Appl. No.: 09/266,448

(22) Filed: Mar. 11, 1999

Related U.S. Application Data

(60) Provisional application No. 60/077,675, filed on Mar. 12, 1998, and provisional application No. 60/081,085, filed on Apr. 8, 1998.

(51) Int. Cl.$^7$ .............................. G02F 1/333; G02F 1/13

(52) U.S. Cl. ..................... 349/73; 349/158; 349/122; 349/202

(58) Field of Search .......................... 349/73, 158, 122, 349/202

(56) References Cited

U.S. PATENT DOCUMENTS

| | | | |
|---|---|---|---|
| 4,690,511 A | | 9/1987 | Watanabe |
| 4,739,345 A | * | 4/1988 | Namba et al. ............... 34/137 |
| 5,068,740 A | | 11/1991 | Brody |
| 5,079,636 A | | 1/1992 | Brody |
| 5,170,100 A | | 12/1992 | Shichao et al. |

(List continued on next page.)

FOREIGN PATENT DOCUMENTS

| | | |
|---|---|---|
| EP | 0351825 | 1/1990 |
| EP | 0770899 | 5/1997 |
| JP | 60247618 | 12/1985 |
| JP | 60263120 | 12/1985 |

OTHER PUBLICATIONS

"LP–A: Late–News Poster: A 40–in. (1–m) Diagonal Direct–View TFT–LCD by Seamless Connection Technique," T. Shinomiya et al., *SID 97 Digest*, 1997, pp. 497–500.

"49.1: Psychophysical Requirements for Seamless Tiled Large–Screen Displays," G.A. Alphonse et al., *SID 92 Digest*, 1992, pp 941–944.

"49.2: Optical Tiled AMLCD for Very Large Display Applications," A. Abileah et al., *SID 92 Digest*, 1992, pp. 945–949.

"49.3: Late–News Paper: Modular Wall–Size IC–Driven Flat–Panel Displays," S.C. Thayer, *SID 92 Digest*, 1992, pp. 950–953.

"28.3: Flat Full–Color Pixel Display Panel and Ultra–Large–Screen Video Display," H. Xi et al., *SID 91 Digest*, 1991, pp. 571–572.

"P–47: A 51–in.–Diagonal Tiled LCD VGA Monitor," N. Mazurek et al., *SID 93 Digest*, 1993, pp. 614–617.

*Primary Examiner*—William L. Sikes
*Assistant Examiner*—Julie Ngo
(74) *Attorney, Agent, or Firm*—Skjerven, Morrill, MacPherson, LLP

(57) ABSTRACT

A seamless tiled display employs active liquid crystal display (LCD) and backlight. The active matrix elements of active LCD are mounted on the inside or outside of the front plate or back plate of LCD. A thin front plate and a thin sealing wall are used to reduce the seam width of the tiled LCD. A laser cutting is used for a thin LCD sealing. A spacer added adhesive array is deposited between pixels and between front plate and back plate to guarantee the uniformity of LC cells thickness. A laser riveting is still used for making a robust plastic LCD. A reflective layer is deposited on the side wall of back plate to reflect the light emitted from the backlight and to reduce the apparent seam width. In the backlight, there can be at least one set of red, green and blue light source operated at color sequential mode to display a color image without the use of color filters.

12 Claims, 9 Drawing Sheets

U.S. PATENT DOCUMENTS

| | | |
|---|---|---|
| 5,191,259 A | 3/1993 | Hayashi et al. |
| 5,229,691 A | 7/1993 | Shichao et al. |
| 5,510,915 A | 4/1996 | Ge et al. |
| 5,557,436 A | 9/1996 | Blose et al. |
| 5,632,946 A * | 5/1997 | Bacon, Jr. et al. .......... 264/212 |
| 5,661,531 A | 8/1997 | Greene et al. |
| 5,852,487 A | 12/1998 | Inou et al. ................... 349/162 |
| 5,889,568 A | 3/1999 | Seraphim et al. .............. 349/73 |
| 6,132,818 A * | 10/2000 | Tanaka et al. .............. 427/596 |

* cited by examiner

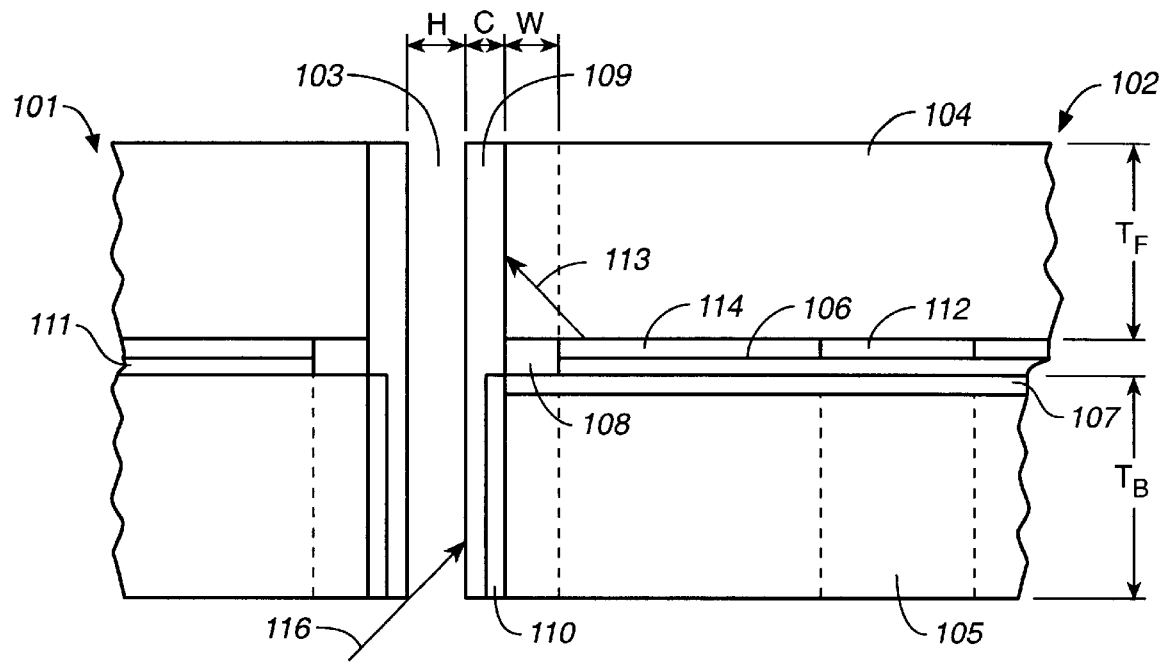
FIG._1a (PRIOR ART)
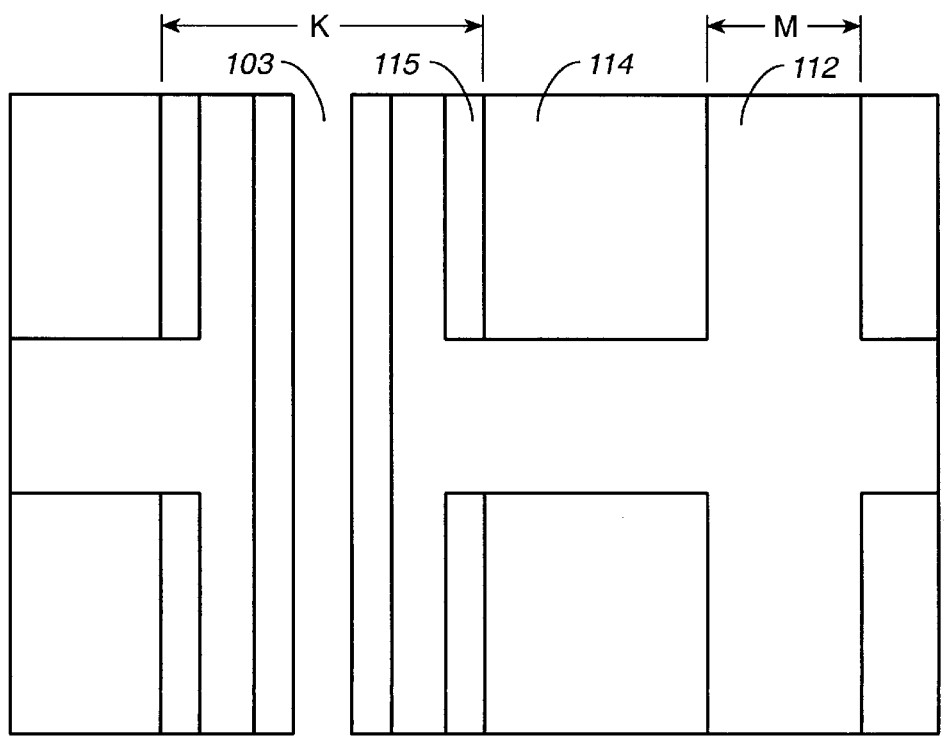
FIG._1b (PRIOR ART)

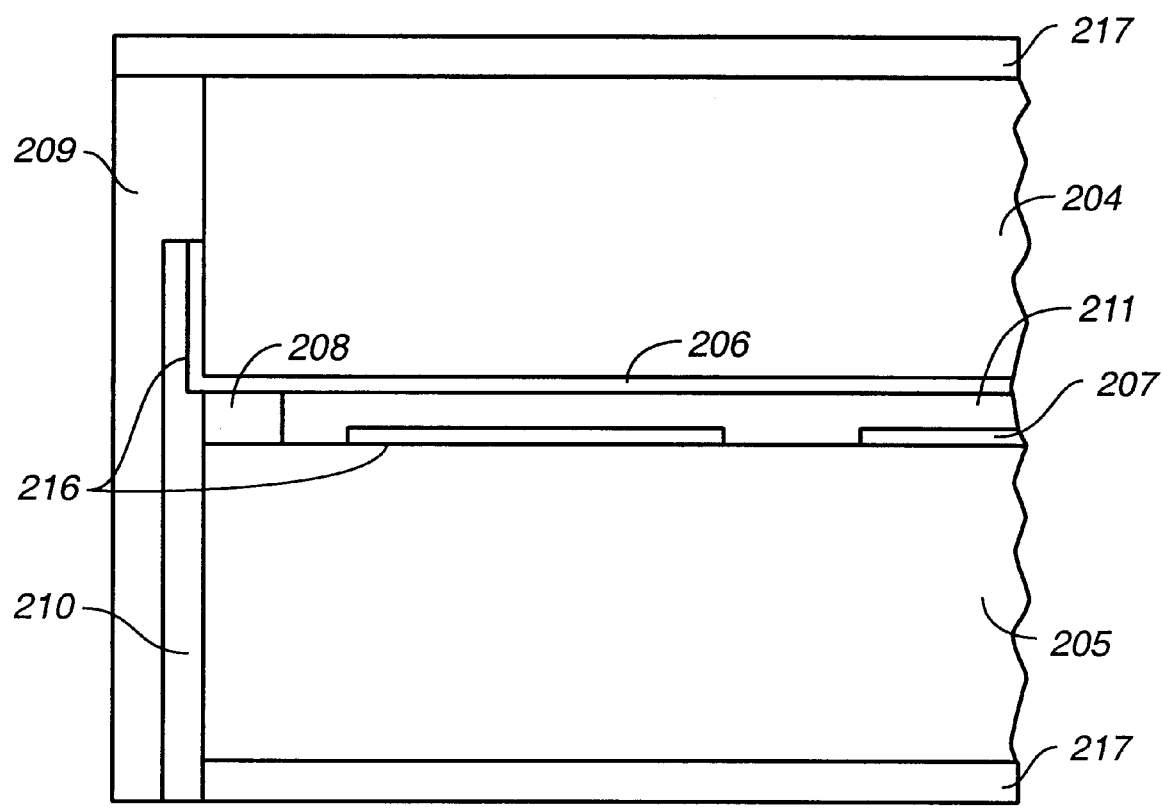
FIG._2
*(PRIOR ART)*

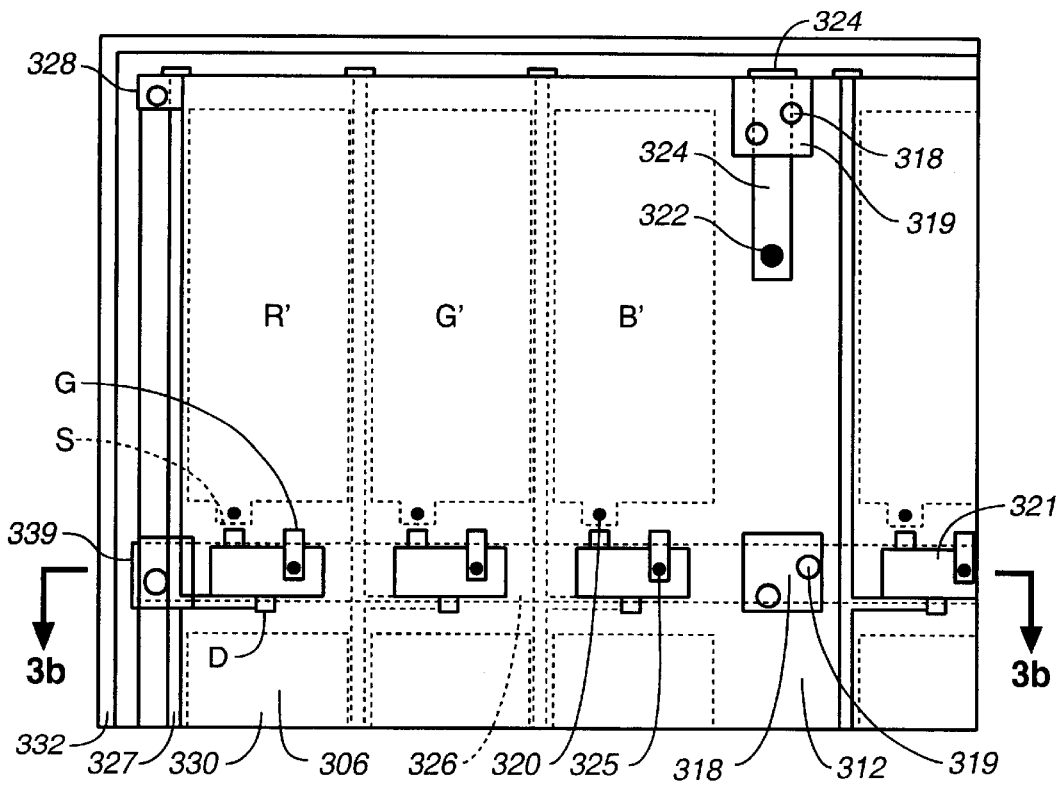
FIG._3a
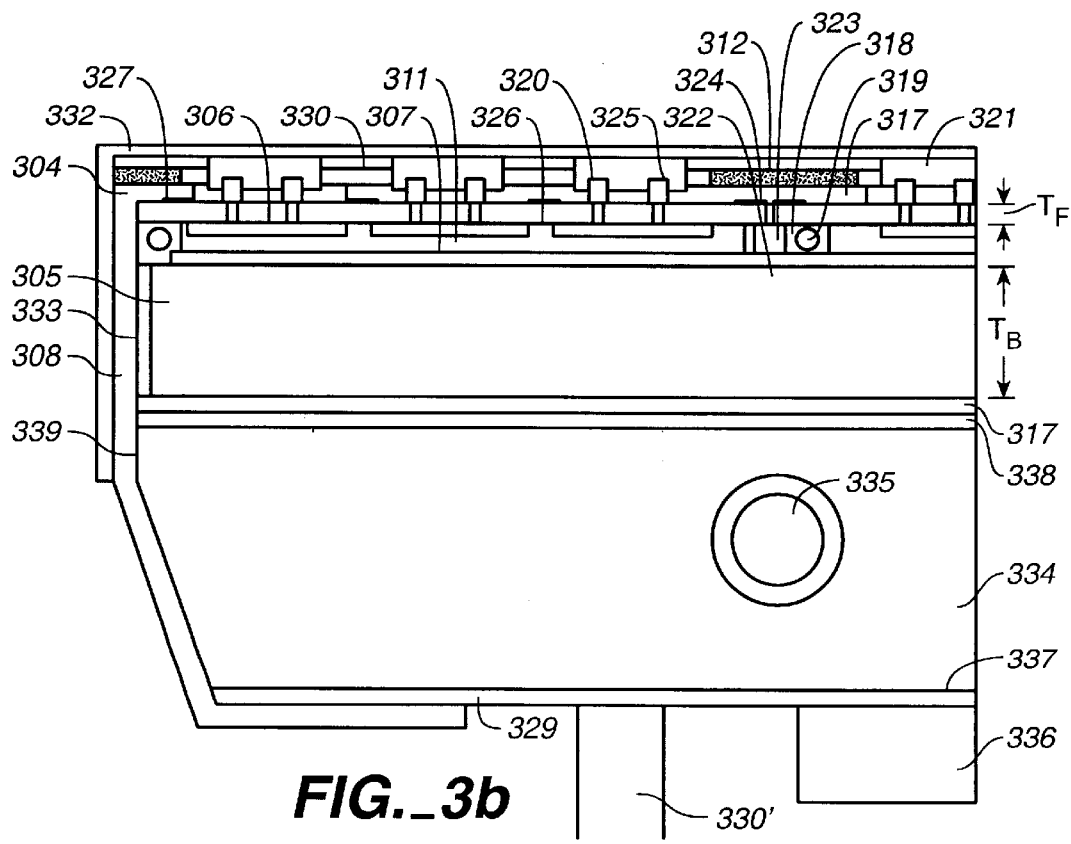
FIG._3b

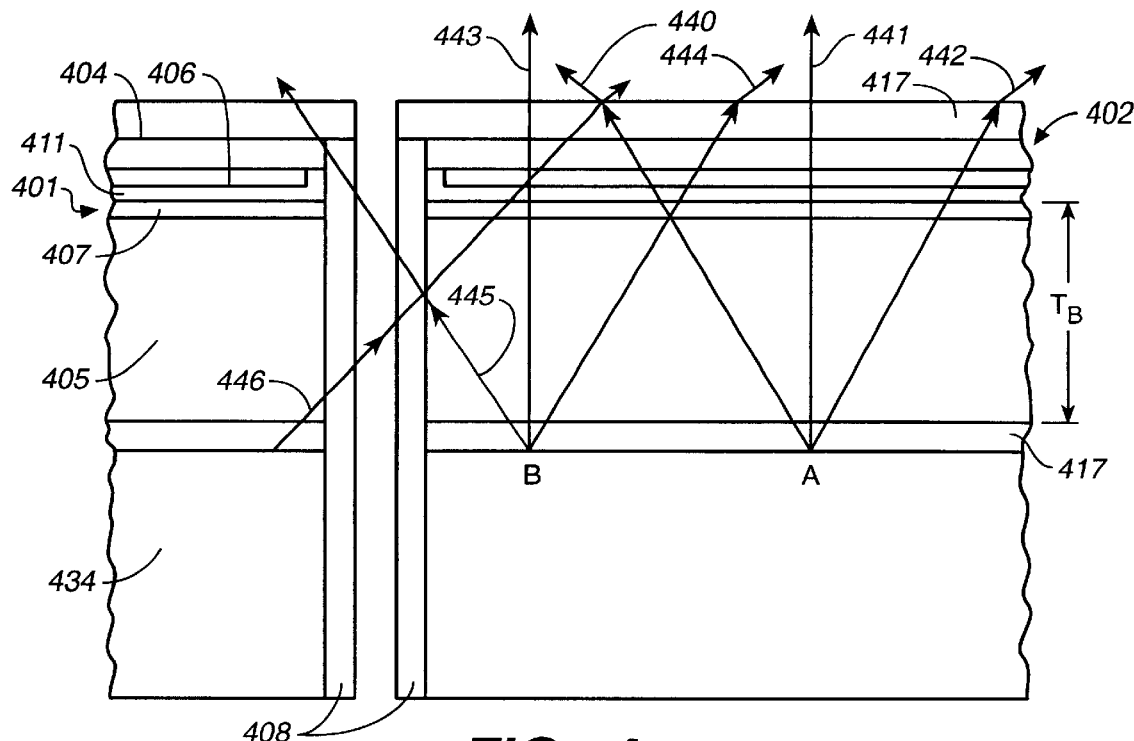
FIG._4
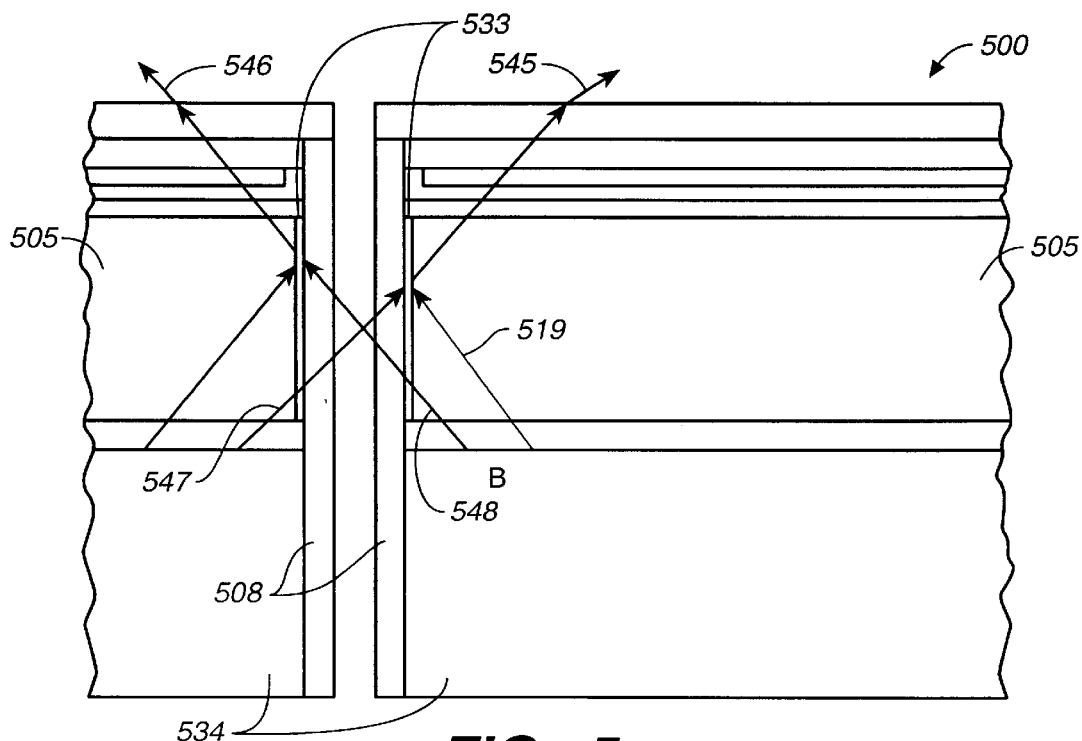
FIG._5

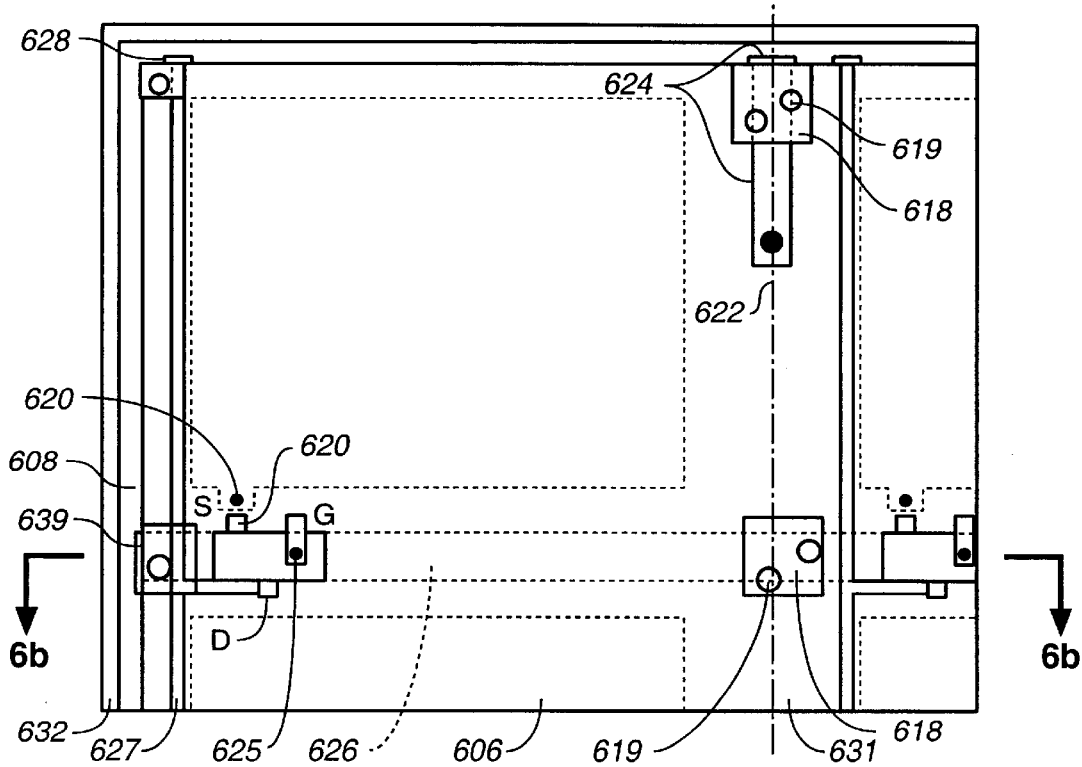
FIG._6a
FIG._6b

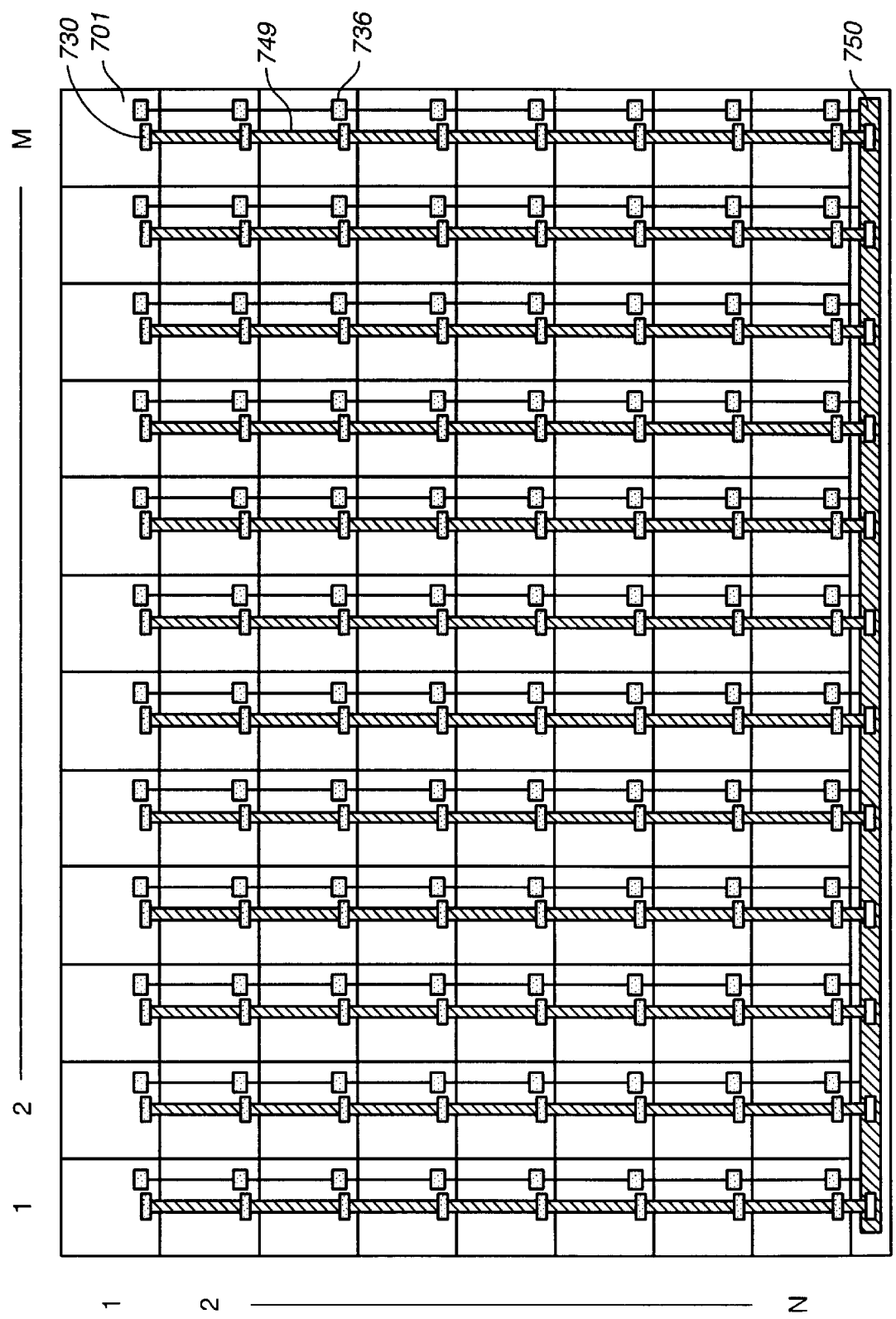
FIG._7

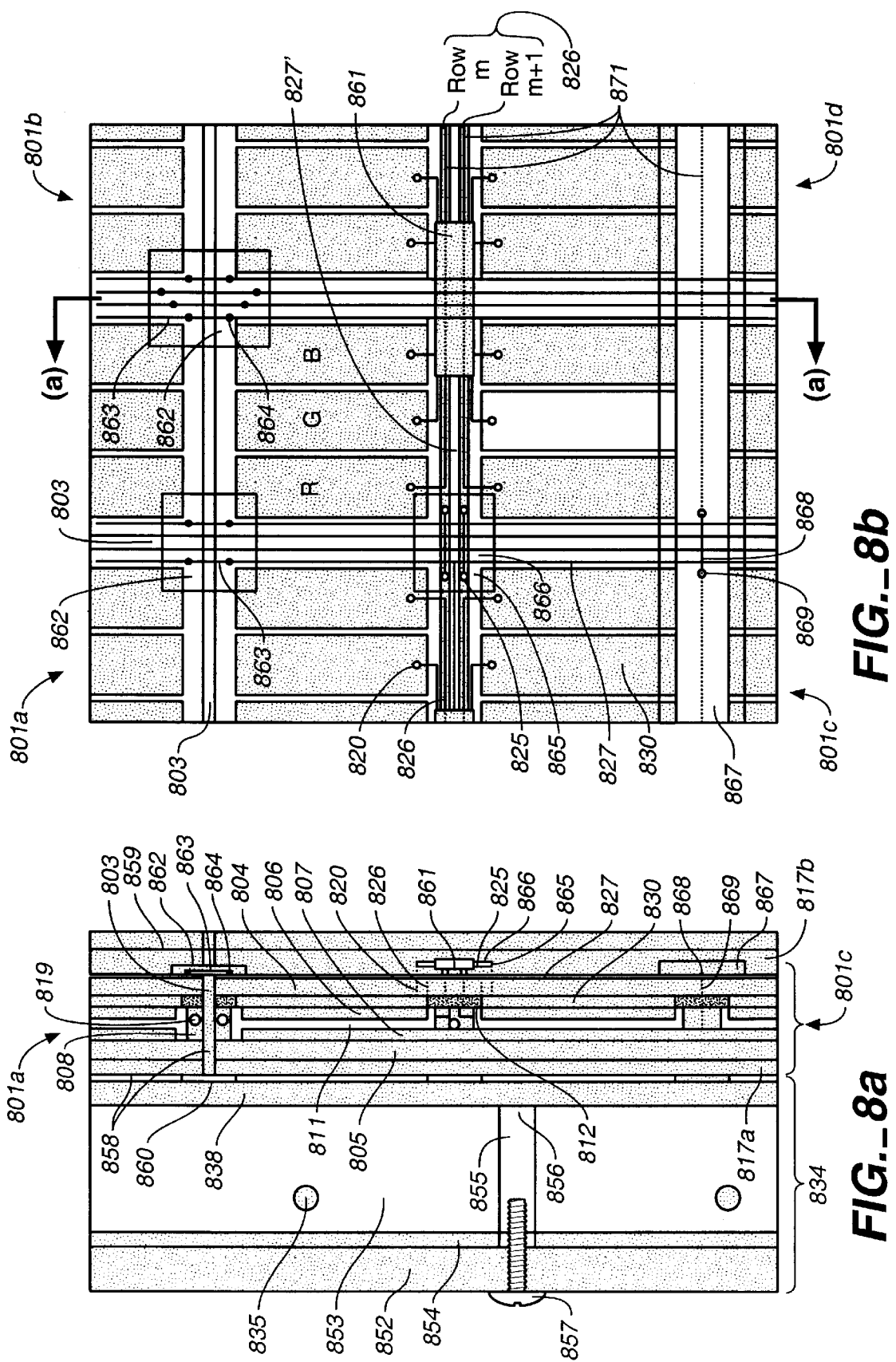
FIG._8b
FIG._8a

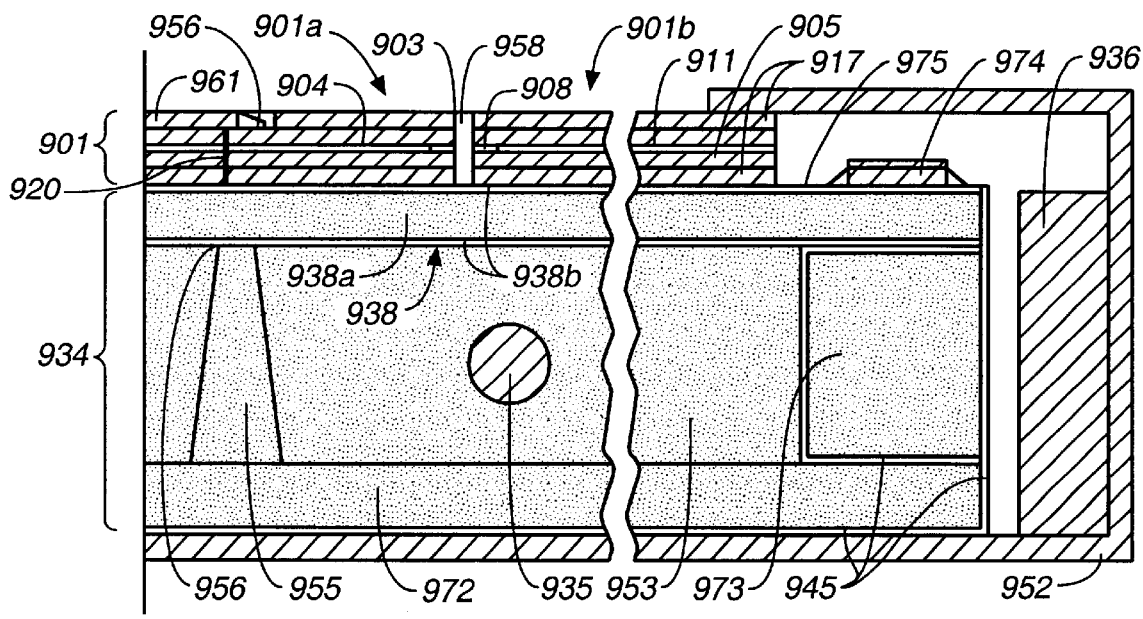
FIG._9
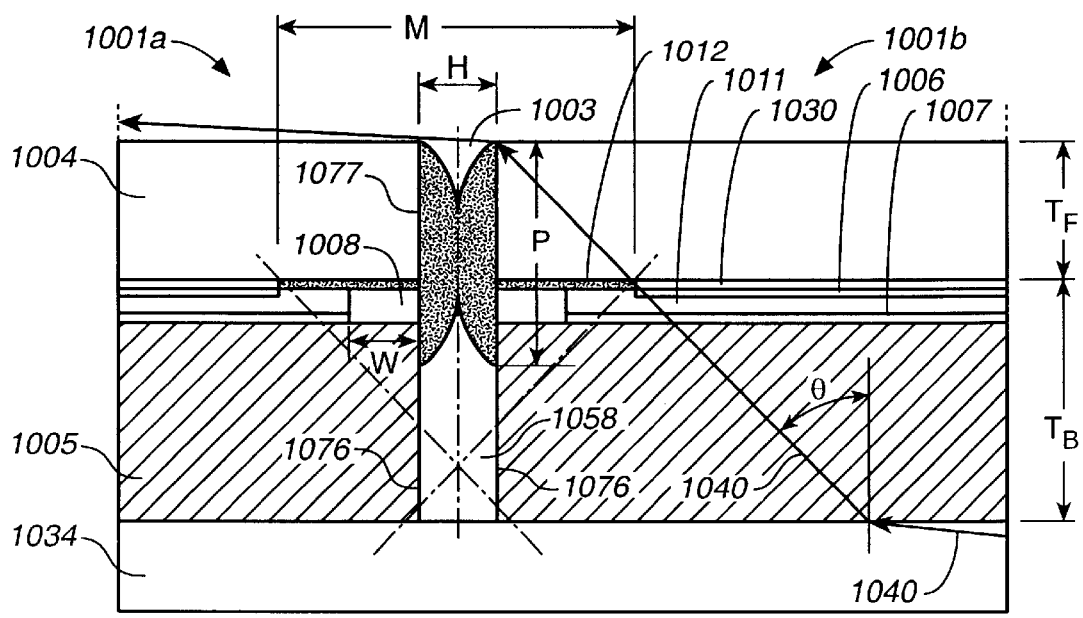
FIG._10

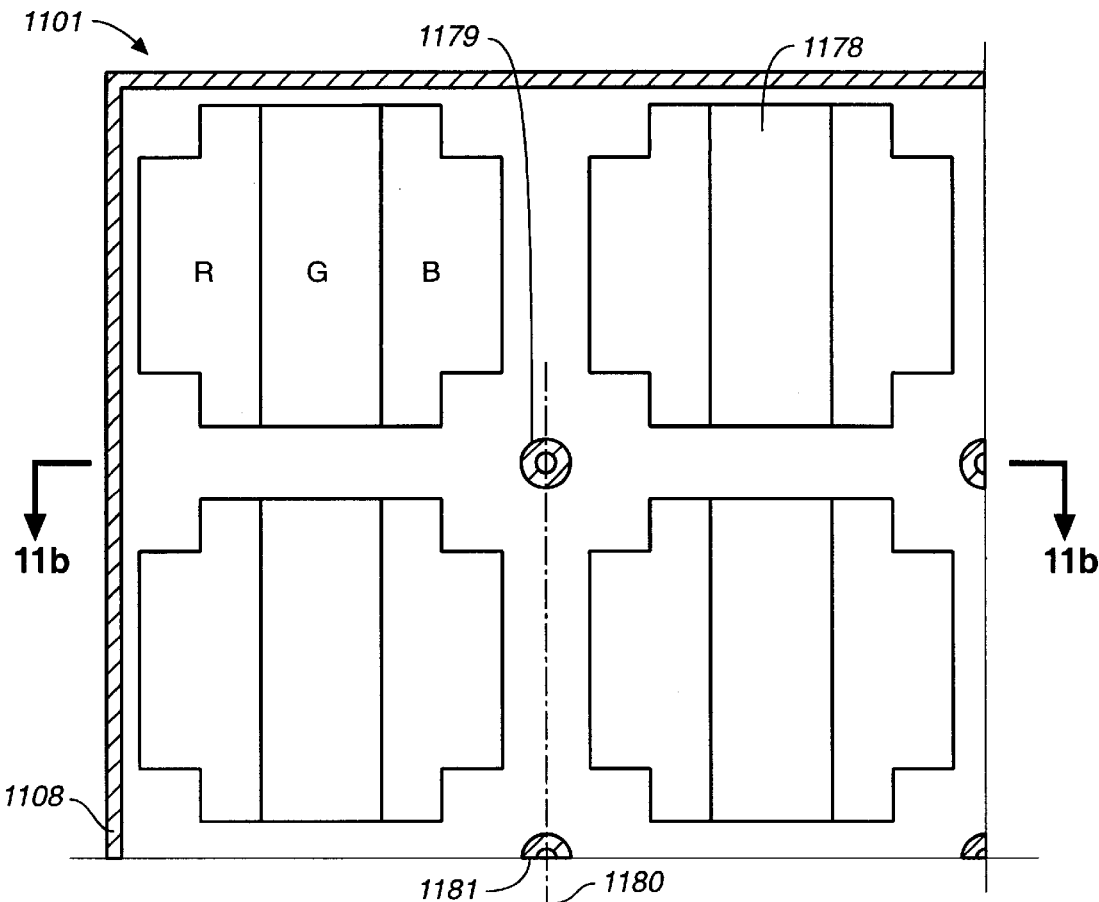
FIG._11a
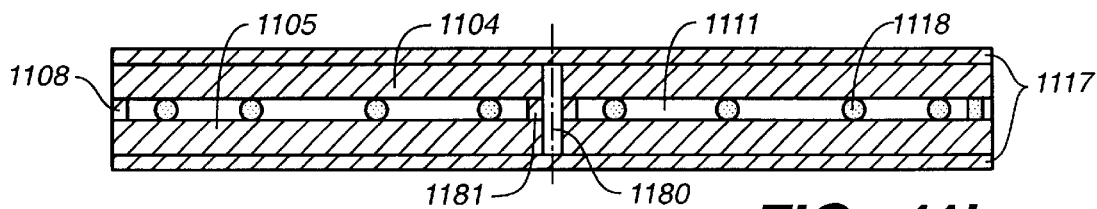
FIG._11b
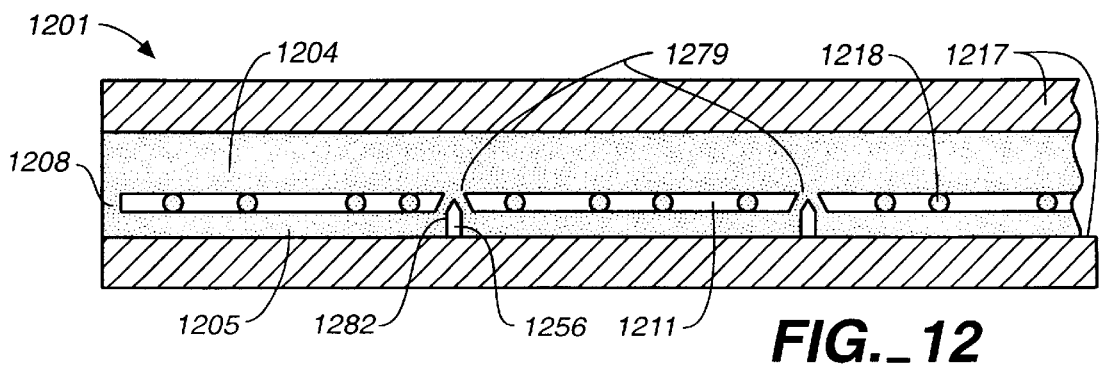
FIG._12

RIVETED LIQUID CRYSTAL DISPLAY COMPRISING AT LEAST ONE PLASTIC RIVET FORMED BY LASER DRILLING THROUGH A PAIR OF PLASTIC PLATES

CROSS-REFERENCE TO RELATED APPLICATION

This application is a continuation-in-part of U.S. Provisional Application Serial No. 60/077,675 filed on Mar. 12, 1998 and U.S. Provisional Application Serial No. 60/081,085, filed on Apr. 8, 1998.

BACKGROUND OF THE INVENTION

This invention relates in general to a seamless tiled display and, in particular, to seamless tiled active liquid crystal display (LCD).

Tiled displays have been used frequently in super-large-screen displays for indoor and outdoor applications to display character and full-color image, such as sports stadiums, exhibition halls etc. Several types of tiled full color super-large-screen displays have been used or proposed. One type known as tiled flat CRT, such as Jumbotron, is a kind of flat matrix CRT which has a hot filament cathode, mesh grid and anode. The anode voltage is about 8 kv, and one display tile includes about 20 color pixels. This kind of display has a good color quality image, but a short lifetime and a high anode voltage.

Another conventional tiled display system currently used is known as a light emitting diode (LED) tiled display. One pixel includes several red, green and blue (R, G, B) LED lamps or chips. It can display a good quality full color image and high brightness, and can be used in both indoor or outdoor applications. But this kind of tiled display is very expensive especially for a super-large-screen display, because it must employ a large number of small individual LEDs that have diameters of about 5 mm.

Another conventional tiled display system is a tiled liquid crystal display (LCD) as described in U.S. Pat. No. 5,557,436. In this kind of display, a passive LCD and a hot cathode fluorescent lamp (HCFL) back-light are used. The color quality, contrast and brightness are not quite satisfactory. Therefore, at present, this kind of display is only used for displaying characters. On the other hand, the seam width of this tiled display is normally quite large. This is caused by the use of a wide sealing wall, a thick front plate and thick back plate. This kind of display cannot be used for a high resolution tiled display.

SUMMARY OF THE INVENTION

This invention is based on active LCD and backlight to make a seamless tiled display. The problems described above with conventional tiled displays are alleviated or avoided altogether.

This invention reduces the visually apparent seam width of the tiled display. For this purpose, a thin glass or plastic front plate of LCD is used. The thickness of the front plate is preferably in the range of about 0.02 to 0.7 mm.

To reduce the visually apparent seam width of the tiled display, a reflective layer is employed on the side wall of the back plate to reflect the light emitted from the backlight. Therefore, the apparent seam width can be reduced.

As explained above, conventional LCD devices employ thick front and back plates because of the requirement that the device be mechanically sturdy. By using a back light or reflector with adequate mechanical strength and connecting LCD tiles to the back light or reflector to lend mechanical strength to the tiles, it is possible to use thin front and back plates in the LCD tiles, thereby reducing or eliminating apparent seam widths and so that the tiled display appears to be seamless.

A plastic LCD device may be conveniently made by aligning LC cells between two sheets of plastic and using a laser to cut the two sheets into smaller pieces by melting the plastic in the two sheets along the lines that are cut. The melting of the plastic at the edges of the smaller pieces causes the front and back portions of the pieces to bond and form a sealing wall. Where a sturdier sealing wall is desired, an adhesive material may be applied between the two sheets along the lines of cutting by the laser to bond the two sheets prior to the cutting process. Therefore, the heat of the laser will melt the plastic material of the two sheets as well as the adhesive material to form a sturdy sealing wall for the LCD devices formed.

To further enhance the mechanical strength of the plastic LCD's, rivets may be formed connecting the front and back plastic plates by applying a drilling laser to the device. The laser may be applied to form one or more holes in the device by melting the front and back sheets at selected spots and the melted plastic of the two sheets are bonded together to form a rivet. Alternatively, for high resolution displays, the rivets are formed without forming visible holes.

BRIEF DESCRIPTION OF THE DRAWINGS

FIG. 1a shows a side cross-sectional view of a conventional display with the apparent tiled seam width K of two adjacent tiled displays.

FIG. 1b shows a top view of FIG. 1a.

FIG. 2 shows a prior art thin seam tiled display.

FIG. 3a shows a top view of an embodiment of the seamless tiled display of the present invention.

FIG. 3b shows a side cross-sectional view of the display of FIG. 3a along line 3b—3b in FIG. 3a.

FIG. 4 shows the effect of the back plate thickness to the seam width of the tiled display.

FIG. 5 shows a side cross-sectional view of a seamless tiled display of the present invention employing a reflective layer on the side wall to illustrate another embodiment of the present invention.

FIG. 6a shows a top view of a seamless tiled display of the present invention employing a reflective layer on the side wall to illustrate yet another embodiment of the present invention.

FIG. 6b shows a side cross-sectional view of the display of FIG. 6a along line 6b—6b in FIG. 6a.

FIG. 7 shows a tiled active LCD display system, which has N X M tiles.

FIG. 8a shows the cross-sectional view of the portion of one more embodiment of seamless tiled LCD display of the invention.

FIG. 8b is the front view of the portion of FIG. 8a. FIG. 8a shows the cross-sectional view of the portion of FIG. 8b along the line 8a—8a in FIG. 8b.

FIG. 9 shows the cross-section view of the portion of another embodiment of seamless tiled LCD of the invention where multiple tiles share a backlight.

FIG. 10 shows a side cross-sectional view of an another embodiment of the seamless tiled display of the present invention.

FIG. 11a shows a top view of an embodiment of the laser sealed and riveted plastic LCD of the present invention.

FIG. 11b shows a cross-sectional view of the display of FIG. 11a along the line 11b—11b in FIG. 11a.

FIG. 12 shows the cross-sectional view of the portion of another embodiment of laser sealed and riveted plastic LCD of the invention.

DETAILED DESCRIPTION OF THE PREFERRED EMBODIMENT

Each tile in a tiled display contains a number of pixels, where the adjacent pixels are separated by an inter-pixel spacing. In order to obtain a seamless tiled display, the actual apparent inter-pixel spacing between two adjacent tiles is preferably the same as the inter-pixel spacing within the display tile. That is the apparent seam width between two adjacent tiles is substantially the same as the inter-pixel spacing within the display tile so that a seamless image can be obtained.

The seam width may be reduced by using a thin front plate. By using a thin front plate, the apparent seam width is reduced. An active matrix LCD may also be used. The active matrix elements of active LCD may be mounted on the interior surface of the substrate of LCD, or more preferably mounted on the outside of the substrate as described in U.S. Pat. No. 5,510,915 named outside-active matrix LCD (OAM-LCD). The active matrix element acts as a switch to control the electrical signal applied to a given LC cell and to eliminate the cross-talk between the LC cells, so that good quality and good contrast images can be obtained.

In order to improve the uniformity of the LC cells thickness, it is preferable to employ an adhesive array has one or more spacers deposited among pixels and between front plate and back plate of the LCD. The sealing wall and the front plate can be one piece or separated. The former can be made of plastic and latter can be made of the same material or different materials; for example, the front plate is made of glass or plastic, and the sealing wall is made of plastic.

The active matrix elements of an active LCD may be mounted on the interior surface of the substrate of LCD, or more preferably mounted on the outside of the substrate as described in U.S. Pat. No. 5,510,915 named outside-active matrix LCD (OAM-LCD). The active matrix element acts as a switch to control the electrical signal applied to a given LC cell and to eliminate the cross-talk between the LC cells, so that good quality and good contrast images can be obtained.

In the case of OAM-LCD tiled display, the active matrix elements are mounted on the outside of the front plate or back plate. The electrodes of the active elements are connected to the electrodes of the LC cell through the conductive pin hidden in the front plate or the back plate. On the other hand, the electrodes of the active elements are connected to the display system electronics through the conductive connectors. These connectors are deposited on the sealing wall, the outside surface of the front plate or the back plate. Therefore, the LCD can modulate the light emitted from the backlight and to display a image.

Due to reduced front plate thickness, sealing wall thickness and depositing a reflective layer on the side wall of the back plate, a seamless tiled display can be made having high resolution.

The invention teaches a full-color tiled display using at least a set of red, green and blue (R, G, B) cold cathode fluorescent lamp (CCF) or light emitting diode (LED) backlight. The R, G, B CCF or LED can be operated in a color sequential mode according to the display signal from the display system electronics. The LCD is also operated according to display signal. The image signal is divided into three sub-field, R, G, B sub-field, when LCD displays red image, the red CCF or LED is lighted, then LCD displays green image, the green CCF or LED is lighted, then blue. Therefore a full-color image can be displayed. In this case, the filter is needless and the brightness of the image will be higher.

To increase the resolution of the tiled display and to get a kind of high resolution tiled LCD, the high resolution tiled LCD comprises of a large screen spacer-shadowless backlight and some tiles. The tiles are mounted on the front diffusing plate of the backlight to form a high resolution tiled LCD.

A laser sealing method may be used for making a plastic LCD. Using the laser to cut the plastic LCD along the sealing area, because the front and back plates of the plastic LCD will be melted during laser cutting, a thin sealing wall will be formed. The laser sealing method can be used for LCD tile and single piece LCD sealing. A good robustness riveted plastic LCD comprises a thin front plastic plate and a thin back plate. In the LCD, there are some rivets riveting said two plates by laser beam. The riveting method can be used for plastic LCD tile and single piece plastic LCD, to get a very robust LCD and large screen plastic LCD.

FIG. 1a shows a side cross-sectional view of a prior art LCD display illustrating the concept of the apparent seam width K of two adjacent tiled displays.

FIG. 1b shows a top view of the display in FIG. 1a.

Adjacent LCD display tiles 101 and 102 are shown in FIGS. 1a, 1b, with gap 103 between the two adjacent display tiles. Each tile has a front plate 104, back plate 105, column electrode 106, row electrode 107 and sealing wall 108. 109 is a side circuit plate, which has conductive connector 110. The connector 110 connects the electrodes 106 and 107 to the driving circuit of the display system. 111 is a LC layer. 112 is a black matrix. The width M of the black matrix is the inter-pixel spacing within the display tile.

The apparent seam width K between two adjacent display tiles depends on the following factors:

the gap width H between two display tiles;
 the sealing wall width W of the display tile;
 the thickness C of the side circuit plate of the display tile;
 the thickness $T_F$ of the front plate of the display tile, because the light ray 113 from the pixel 114 proceeding to the side wall 109 will be obstructed by the side wall;
 the thickness $T_B$ of the back plate of the display tile, because the light ray 116 from a backlight or a back reflector proceeding towards the side wall 109 will be obstructed by the side wall;
 the non-uniformity of the luminance and the color near the tiled seam area. If the luminance or color is non-uniform near the tiled seam, e.g., the luminance of the area 115 is lower than the area 114 or the color is different, the apparent seam width K will be larger.

The actual apparent tiled seam width K is the sum of factors mentioned above.

For a seamless tiled display, the luminance and the color should be uniform in the whole active display area, and the apparent tiled seam width K should be the same as the inter-pixel spacing M within the display tile.

FIG. 2 shows a prior art thin seam passive tiled LCD (e.g., U.S. Pat. No. 5,557,436), which has a thin sealing wall 208 and thin side tape 209. 204 and 205 are the front plate and back plate. 206 and 207 are row and column electrodes of the display. 210 is the conductive connector located on the side tape 209. The conductive connector 210 connects the electrodes 206 and 207 to the driving circuit (not shown) of the display system. 211 is a LC layer operated at passive mode. 217 are polarizers.

In the conventional tiled LCD, thick front and back plates are used to assure that the LC layer 211 has uniform thickness, so that the LCD displays a uniform image. The thick front and back plates make the apparent tiled seam width K larger.

On the other hand, in the conventional tiled LCD, the row and the column electrodes of the display are extended from the front and back plate interior surfaces to the side surfaces of the plates through the rectangle edges 216 of the plates. In this case, the electric connection can easily become broken at or near the edges, resulting in an open circuit, which means the reliability of this structure is usually rather poor.

In the conventional tiled LCD, a passive LCD is used. In this case, the contrast and image quality are usually less than satisfactory, because of the cross-talk between LC cells. In addition, in the conventional tiled LCD, a hot cathode fluorescent lamp back-light (HCFL-BL) is used for tiled LCD. Hence the brightness of the display may be inadequate for some applications and the life-time of the display is short.

FIG. 3a shows a top view of a portion of an embodiment of a seamless tiled outside-active-matrix LCD (OAM-LCD) of the invention, and FIG. 3b is a cross-sectional view of the LCD of FIG. 3a along the line 3b—3b in FIG. 3a. In FIG. 3a and FIG. 3b, 304 is a thin front plate, and 305 is the back plate. 304 and 305 are transparent substrate, e.g., glass or plastic. 308 is a thin sealing wall, which can be one integral piece with the front plate 304 or a separate piece. 306 is a separated electrode array of LCD, and 307 is a common electrode of LCD. Electrodes 306 and 307 define a matrix LCD. 311 is a LC layer. 318 is an adhesive array having at least one spacer but preferably a plurality of spacers 319 deposited among pixels and between front plate 304 and back plate 305. This adhesive array can guarantee the uniformity of the LC cell's thickness to get a uniform display image.

320 is a series of conductive pins hidden in the front plate 304. One terminal of the pin 320 is connected to the separated electrode 306, the other terminal of the pin 320 is connected to the source electrode (S) of the outside active matrix device 321, which may for example be a field effect transistor (FET), and which is preferably mounted on the outside surface of the front plate 304. Instead of a FET, the outside active matrix control device 321 may also be a diode, bipolar transistor, switch, or varistor etc. As shown in FIG. 3a, one outside active device 321 controls one LC cell, i.e. one color dot. But these active devices can also be integrated into an integrated circuit chip, i.e. one chip controls one group of LC cells. 322 is another conductive pin hidden in the front plate 304, one terminal of the pin being connected to the common electrode 307 through a conductive means 323, i.e., silver (Ag) paste, and the other terminal of the pin 322 being connected to the conductive connector 324 and then connected to the system driving circuit (not shown) through the printed circuit board (PCB) 329. 325 is a series of another conductive pin hidden in the front plate 304, one terminal of the pin 325 is connected to the row scanning electrode 326, and the other terminal of the pin 325 is connected to the gate electrode (G) of the outside active matrix device 321. The row scanning electrode 326 is connected to the PCB 329 through conductive connector 339, then connected to the system driving circuit (not shown) through the connector 330'. 327 is a column signal electrode, one terminal of the electrode 327 being connected to the drain electrode (D) of the outside active matrix device 321, and the other terminal to the PCB 329 through connector 328, then to the system driving circuit (not shown).

317 are two polarizers, one is located at the outside surface of the front plate 304, and other one is located at the outside surface of the back plate 305. 330 are color filters, deposited on the outside surface of the front polarizer 317. For a monochrome or black/white display, this filter may be omitted. 331 is a black matrix.

332 is an outside sealing cover, which is an anti-reflective plate, a transparent or diffusing plate, or having the optical function to change the light direction to alter the viewing angle, e.g., micro-lens plate or holographic plate and the like. This cover may cover only one tile, or two or more tiles up to the entire screen of the display. If this cover does not cover the entire screen, more than one cover may be employed to cover all the tiles of the screen.

333 is a reflective layer deposited on the side wall of the back plate 305, the operating principle of which is illustrated below in reference to FIG. 5.

334 is a back-light, which has at least one CCF, HCFL or LED 335 as its light source. 336 is a driver for CCF, HCFL or LED 335. The driver 336 has a brightness adjustment circuit to adjust the brightness of the backlight by manual or a sensor to automatically adjust the brightness in order to guarantee the brightness uniformity in the whole tiled screen. To adjust the brightness manually, one may adjust a potentiometer in the circuit, for example. To adjust the brightness automatically, a photodiode in the circuit may be used to provide feedback signal so as to adjust the brightness, for example. 337 is a reflective chamber of the backlight 334. 338 is a diffuser and a brightness enhancement film (BEF) of the backlight 334.

In this embodiment, thin front plate, thin sealing wall and back plate side wall reflector are used, so the apparent seam width can be very small, therefore, the high resolution seamless tiled display can be made. For example, the thickness of front plate 304, $T_F$, may be in a range of about 0.02 to 0.7 mm, and the thickness of back plate 305, $T_B$, may be in a range of about 0.02 to 4 mm. With the front and back plates of such thicknesses, the apparent seam width is much reduced compared to the conventional displays.

FIG. 4 shows a cross-sectional view of a tiled display, which shows the effect of a thick back plate on the apparent seam width of the tiled display. 401 and 402 are two adjacent tiled LCDS. 404 and 405 are the front plate and back plate. 406 is the separated electrode (similar to 306 in FIG. 3) and 407 is the common electrode. 411 is a LC layer, and 417 are the polarizers. 434 is a backlight.

In FIG. 4, "A" shows a location which is far from the sealing wall 408. In this area, the light rays in all directions, 440, 441 and 442, can go through the display, however, at or near the sealing wall area B, the light beams in the directions 443 and 444 can go through the display, but the light beam 445 will be obstructed by the sealing wall 408. 434 may be a backlight in a transmissive LCD or a light reflector in a reflective LCD. The light beam 446 emitted from backlight 434 (for transmissive LCD) or reflected by reflector 434 (for reflective LCD), (equivalent to beam 445 from the area B), will be also obstructed by the sealing wall 408. Therefore, the apparent seam width will be wider. The thicker the back plate TB, the bigger the apparent seam width.

In order to eliminate or reduce the effect of the thick back plate on the apparent seam width a reflective layer can be deposited on the side wall of the back plate. FIG. 5 shows the reflective layer 533, which is deposited on the side wall of the back plate 505, which can reflect the light beams 545 and 546 to illuminate the LC cell. The light beams 545 and 546 are similar to 547 and 548, which are emitted from backlight 534 for a transmissive LCD or reflector 534 for a reflective LCD. In other words, where 534 is a backlight, device 500 is a transmissive LCD; where 534 is a reflector, device 500 is a reflective LCD. Therefore, the effect of the back plate thickness on the seam width can be eliminated or reduced, and a high resolution seamless tiled display can be obtained.

FIG. 6a shows a top view of the portion of another embodiment of a seamless tiled OAM-LCD of the invention, and FIG. 6b is the cross-section view of the LCD of FIG. 6a along line 6b—6b in FIG. 6a. In this embodiment, a thin front plate and the R, G, B CCF or LED backlight are used. This display can be operated at color sequential mode to get the full-color image without using color filters. In FIG. 6a and FIG. 6b, 604 is a thin front plate, and 605 is a back plate. The plates 604 and 605 are transparent substrate, e.g., glass or plastic. 608 is a thin sealing cover, and made of plastic. 606 is a separated electrode array of LCD, and 607 is the common electrode of LCD. Electrodes 606 and 607 define a matrix LCD. 675 is a LC layer. 618 is an adhesive array which has spacer 619 deposited between pixels and between front plate 604 and back plate 605. This adhesive array can guarantee the uniformity of the LC cells thickness to get a uniform display image.

620 is a series of conductive pins hidden in the front plate 604, one terminal of the pin 620 is connected to the separated electrode 606, the other terminal of the pin 620 is connected to the source electrode (S) of the outside active matrix device 621, e.g. FET, which is mounted on the outside surface of the front plate 604. As the outside active matrix device, diode, switch, varistor etc. can also be used. As shown in FIG. 6, one outside active device control one LC cell, i.e. one color dot. But these active devices can also be integrated into the chip, i.e. one chip controls one group of LC cells. 622 is another conductive pin hidden in the front plate 604, one terminal of the pin 622 is connected to the common electrode 607 through a conductive means 623, i.e., Ag paste, and the other terminal of the pin 622 is connected to the conductive connector 624 (which bends down at sealing wall 608 to reach PCB 629) and then connected to the system driving circuit through the PCB 629. 625 is a series of another conductive pin hidden in the front plate 604, one terminal of the pin 625 is connected to the row scanning electrode 626, and the other terminal of the pin 625 is connected to the gate electrode (G) of the outside active matrix device 621. The row scanning electrode 626 is connected to the PCB 629 through conductive connector 639, then connected to the system driving circuit through the connector 630. 627 is a column signal electrode, one terminal of the electrode 627 is connected to the drain electrode (D) of the outside active matrix device 621, and the other terminal is connected to the PCB 629 through connector 628, then to the system driving circuit (not shown) through connector 630.

617 are two polarizers, one is located at the outside surface of the sealing cover 608, and an other is located at the outside surface of the back plate 605. 631 is a black matrix.

632 is an outside sealing cover, which is an anti-reflective plate, a transparent or diffusing plate, or having the optical function to change the light direction to change the viewing angle, e.g., micro-lens plate or holographic plate and the like. 633 is a reflective layer deposited on the side wall of the back plate 605.

634 is a backlight, which has at least one set of R, G, B light sources, such as HCFLs, CCFLs or LEDs 635. 636 is a driver for HCFLs, CCFLs or LEDs 635. 637 is a reflective chamber of the backlight 634. 638 is a diffuser and a brightness enhancement film (BEF) of the backlight 634.

The R, G, B HCFLs, CCFLs or LEDs 635 can be operated in a color sequential mode according to the display signal from the display system electronics. At the same time, the LCD is also operated according to display signals. The image signal is divided into three sub-field, i.e. R, G, B sub-field. When LCD displays red image, the red CCF or LED is lighted; then LCD displays green image, the green CCF or LED is lighted; and then blue. Therefore a full-color image can be displayed. In this case, color filter need not be used so that the brightness of the image will not be reduced by the filters and will be higher than otherwise.

FIG. 7 shows a tiled active LCD display system, which has N by M tiles 701, where N, M are positive integers. Each tile has a backlight with HCFLs, CCFLs or LEDs (not shown) and a driver 736 (performing the same function as driver 636 of FIG. 6) for driving the backlight, and a connector 730 similar to connectors 330, 630 of FIGS. 3b and 6b. 750 is a control and driving circuit of the system. 749 is a cable connecting each tile to circuit 750 through connectors 730. Thus, the system driver circuit 750 controls the driver circuits 736 which in turn drives the backlight of the tiles 701. Circuit 750 also controls the voltages applied to the common electrode (not shown in FIG. 7) which are similar to the common electrodes 307 and 607 in FIGS. 3a, 3b, 6a, 6b, and the separated electrode array (not shown in FIG. 7) similar to arrays 306 and 606 in FIGS. 3a, 3b, 6a, 6b. Circuit 750 is connected to the common electrode and separated electrode array through connector 730 of each tile, where connector 730 serves the same function as connectors 330, 630 of FIGS. 3a, 3b, 6a, 6b. In this manner, circuit 750 controls the sequential addressing of the entire display comprising N×M tiles. As shown in FIG. 7, the connector 730 of each tile are connected to circuit 750 by means of cable 749. The drivers 736 of all the tiles are connected to the circuit 750. In the particular design illustrated in FIG. 7, each tile has its own backlight and backlight and backlight driver, which is controlled by circuit 750 so that the N×M tiles act as one display.

FIG. 8a shows the cross-sectional view of a portion of another embodiment of seamless tiled LCD of the invention; and FIG. 8b is the front view of FIG. 8a. In this embodiment, the LCD tiles have thin front plate 804 and thin back plate 805, and are mounted on a backlight or reflector 834 with good mechanical strength so that the LCD in the tiles will have uniform thickness. The backlight or reflector 834 is used as a base plate of the display screen, and can be made a very light weight, thin profile, very strong large screen and super-large screen display. The tiled display is like a single piece display. In other words, by relying on the backlight for strength to maintain the LCD at a uniform thickness, it is possible to reduce the thicknesses of both the front and back plates to reduce apparent seam width.

In FIGS. 8a and 8b, 801a, 801b, 801c and 801d are the portions of four adjacent LCD tiles. The LCD tile can be a transmissive LCD, reflective LCD, scattering LCD or outside-active-matrix LCD (OAM-LCD).

In FIGS. 8a, 834 is a backlight or reflector device with good mechanical strength. For a transmissive tiled LCD, 1034 is a backlight, which has at least one light source 835, e.g. hot cathode fluorescent lamp (HCFL), cold cathode fluorescent lamp (CCF) or LED. 852 is a good mechanical strength frame, which is made of metal or plastic, e.g.

aluminum alloy and steel. 853 is a reflective chamber, which has high reflective walls 854, and the front face of the reflective chamber 853 is a diffusing plate 838 to make the brightness of the backlight very uniform. In order to increase the brightness of the backlight, the diffusing plate 838 can also have a brightness enhancement function, e.g. with a brightness enhancement film. 855 is a spacer of the backlight, which is located between the front diffusing plate 838 and the bottom surface of the reflective chamber 853, so that the good mechanical strength of the frame 852 lends support also to the diffusing plate 838 through the spacer 855, thereby enabling the diffusing plate to have a very flat surface.

The spacers 855 can be a transparent round pole, cone shape or other shape, which is made of a transparent material, e.g. plastic or glass. The top of the spacers 855 are polished, mounted and attached on the diffusing plate 838 by transparent adhesive 856. The other end of the spacers 855 are fixed on the frame 852 by screw(s) 857. The frame 852, reflective chamber 853, front diffusing plate 838 and spacer 855 formed a very bright backlight with good mechanical strength.

FIGS. 8a and 8b show an embodiment of a seamless tiled OAM-LCD of the invention. 801a, 801b, 801c and 801d are the portions of four adjacent OAM-LCD tiles. The tiles are mounted on the diffusing plate 838 by adhesive 858. 803 are gaps between the adjacent LCD tiles. Gaps 803 between tiles may be filled by adhesive 858. The thin front plate 804 and thin back plate 805 are made of glass or plastic, and their thicknesses range from 0.01 to 4 mm, to reduce obstruction of light from the backlight and the apparent seam width. 830 and 812 are respectively the filter and the black matrix, which can be deposited on the inside surface or outside of the thin front plate 804 or back plate 805. 811 is a LC layer, including transmissive LC, e.g. TN, STN, and scattering LC, e.g. polymer dispersed LC (PD-LC). 817a and 817b are two polarizers, one of which is located at the outside of the thin front plate 804, and the other is located at the front surface of the diffusing plate 838, or at the outside of the back plate 805 of the LCD tile. The polarizers can be one sheet per display screen or one sheet per tile. In the case of scattering LC, the polarizers may be omitted. 808 is a sealing wall, which has spacer 819. 806 is a separated electrode array of LCD, and 807 is a common electrode of LCD. One separated electrode and the common electrode defined one LC cell. Each separated electrode 806 has one corresponding color filter 830 for color display.

In order to increase the viewing angle and contrast of the display image, an optical front plate 859 is located at the front of the tiled screen. The optical front plate has some optical function, e.g. diffusing, anti-reflection, viewing angle changing etc. to increase viewing angle, contrast, and brightness.

The black matrices 812 may absorb a significant portion of the light originating from the backlight. In order to increase the light utilization of the backlight despite the black matrices, reflective matrices 860 are deposited at the outside surface of the back polarizer 817a or the outside of the front diffusing plate 838. Each of the reflective matrices is aligned with a corresponding black matrix 812, and reflects back towards the chamber 853 the light which is emitted by the backlight and which otherwise would be directed towards and be absorbed by the corresponding black matrix. This increases the light utilization of the backlight.

Each LCD tile has at least one row electrode 826, which is deposited on the inside surface of the front plate 804, and at least one column signal electrode 827, which is deposited on the outside surface of the front plate 804. 861 is an outside-active-matrix (OAM) chip, which has at least one active device of OAM-LCD and is mounted on the outside surface of the front plate 804. In the case of FIG. 8a, the chip 861 has 12 active devices (e.g. FETs) to control four pixel (each pixel having 3 LC cells for red, green and blue light for a total of 12 LC cells). For example, one chip 861 has 12 FETs, and each set of 6 FETs have one common gate electrode.

Two row electrodes 826 for row m and row (m+1), m ranging from 0 to 511, for example, are connected through pins (not shown) to two gate electrodes of FETs respectively; and 6 column signal electrodes 827 are connected to the D (drain) electrodes of FETs respectively. Twelve S electrodes of FETs are connected to twelve separated electrodes 806 through the conductive pins 820, which are hidden in the front plate 804. When one row, e.g. row m, is applied a row scanning voltage, all the FETs connected with this row are turned on. The video display signal will be applied to the related D electrodes of FETs through related column electrodes 827 and related FETs, and apply to the related LC cells 811 to change the transmittance of the LC cells, and to display the image. Once an LC cell is turned on, its transmittance remains unchanged until it is again addressed, so that a full color display results from the sequential addressing.

Between the LCD tiles, the column electrodes 827 are connected by a connector 862, made of a transparent means, e.g. transparent film, with some electrically conductive leads 863 deposited, which connect the related column electrodes between the adjacent LCD tiles through the electrically conductive connection pads 864. Between the LCD tiles, the row electrodes 826 are connected by a connector 865, which is made of a transparent means, e.g. transparent film with some electrically conductive leads 866 deposited. The connector connects the related row electrodes between the adjacent LCD tiles through the electrically conductive pins 825, which are hidden in the front plate 804. One LCD tile has one common electrode 807. The connector 867 is made of a transparent means, e.g. transparent film, and the conductive lead 868 is deposited, which is used for connecting the common electrodes 807 of the adjacent LCD tiles through conductive pins 869 and conductive material 870, e.g. silver paste.

In other words, each OAM chip includes 12 FETs, one for controlling each of 12 LC cells. In reference to FIG. 8b, for example, chip 861 would control the three LC cells in each of the four pixels immediately adjacent to the chip. Chip 861 would receive addressing signals from an outside controller (not shown) through two row electrodes 826: rows m and m+1. The addressing signal in row m would control the addressing of the pixels immediately above it and the addressing signals in row m+1 would control the addressing of the pixels immediately below the row as shown in FIG. 8b. When the addressing signal to row m is asserted, this causes the six FETs addressing the two pixels immediately above row m and adjacent to chip 861 to be turned on. Each of the six LC cells in the two pixels immediately above row m is controlled by a corresponding column signal electrode 827. Therefore, the brightness of the display in each pixel is controlled by three corresponding column signal electrodes 827. The video signals on the corresponding column signal electrode 827 would then be applied to the drain electrode of the FET corresponding to each of the six LC cells to control the brightness of the image displayed by such cell. As shown in FIG. 8b, two column electrodes 827 is shown to overlap the connector 862 on the left portion of the figure and are connected to the chip 861 through lines 827' and four column signal electrodes are shown to overlap the connector 862 on the right-hand portion of the figure. Of such six column signal electrodes, three are used for controlling the brightness of the pixel in between the two adjacent connectors 862. Row electrodes 826 and column electrodes 827 are then connected to the system driver circuit (not shown) for controlling the addressing of the LC cells.

In order to reduce the resistance of the row electrodes, column electrodes and the common electrodes, and also to increase the connector reliability, the auxiliary electrodes 871 can be used, which can be deposited on the outside of the front plate 804 or on the connectors 862, 865 and 868. If the auxiliary electrodes 871 are located on the connectors 862, 865 and 868, said connectors should be the prolong tapes, e.g. shown as 868, and the auxiliary electrodes are in parallel with the related electrodes.

FIG. 9 shows the cross-section view of the portion of anther embodiment of a high resolution seamless tiled LCD of the invention. In this embodiment, the LCD comprises of thin LCD tiles 901 and backlight 934. 901a and 901b are the adjacent LCD tiles. The LCD tile can be a transmissive LCD, scattering LCD or OAM-LCD.

In FIG. 9, 934 is a backlight which with good mechanical strength. In the backlight 934, there are at least one light source 935, e.g., HCFL, CCF or LED. 952 is a good mechanical strength frame, which is made of metal or plastic, e.g., alloy and steel. 953 is a reflective chamber, which has high reflective walls 945. The front face of the reflective chamber 953 is a diffusing plate 938, which makes the brightness of the backlight very uniform. 972 is a transparent back plate of the backlight 934, which is used for eliminating the spacer shadow and to improve the brightness uniformity of the backlight. The coefficient of thermal expansion of the transparent back plate 972 is matched with (that is, substantially the same as) front diffusing plate 938 to assure that the backlight does not bend at different operating temperatures and its mechanical strength is maintained over a wide range of operating temperatures. 955 is the transparent spacer of the backlight, which is located between the front diffusing plate 938 and the transparent back plate 972. 973 is the side wall of the backlight 934. The fame 952, front diffusing plate 938, transparent back plate 972, spacers 955 and side wall 972 forms a backlight with good mechanical strength.

The diffusing plate 938 can be a thick diffusing plate or comprises of a transparent plate 938a and one side or both sides diffusing layers 938b. In order to increase the brightness of the backlight, the diffusing plate 938 can also have a brightness enhancement function, e.g. with a brightness enhancement film.

The spacer 955 can be a transparent cone spacer or other shape spacer, which is made of a transparent material, e.g. plastic or glass. The top of the spacers 955 are polished, mounted and attached on the diffusing plate 938 by adhesive 956.

FIG. 9 shows an embodiment of a seamless OAM-LCD tiled LCD. 901a and 901b are two adjacent OAM-LCD tiles, which have thin front plate 904 and thin back plate 905, and are mounted on the diffusing plate 938 of the backlight 934 by adhesive, e.g. anisotropic adhesive. The thin front plate 904 and thin back plate 905 are made of glass or plastic, and their thicknesses range from 0.01 to 8 mm, to reduce obstruction of light from the backlight and the apparent seam width. The front and back plates can be very thin since they rely on the backlight for support so that they remain flat and uniform. 911 is LC cell, which with electrodes, filter, black matrix, alignment layer and LC layer. 908 is the sealing wall of LCD. 917 are the polarizers. 903 are the gaps between the adjacent LCD tiles. Adhesive 958 may fill gaps 903. The details of the gap and the LCD tile structure are shown in FIG. 10 which is an exploded view of a portion of the device in FIG. 9. The backlight can be made in any dimensions. A large backlight of the construction described herein can have a diagonal dimension of not less than 20 inches.

In FIG. 9, 961 are the OAM chips, which are mounted on the tile 901 by adhesive 956, e.g. anisotropic adhesive or wire bonding and adhesive. The chips 961 are connected to the row and column electrode driving electronics 974 through the hidden conductors 920 and conductors 975, which are deposited on the surface of the diffusing plate 938 of the backlight 934. 975 is preferably located underneath the black matric layer so that it does not block light from the back light towards the pixels. 936 is the display system driving circuit, for driving the common and addressing electrodes (not shown) and the light source 935.

FIG. 10 shows an enlarged cross-sectional view of the adjoining portions of two adjacent LCD tiles in the seamless tiled structure of FIG. 9. 1001a and 1001b are the adjacent tiles. 1004 and 1005 are the front plate and the back plate. 1008 is the sealing wall. 1006 and 1007 are the electrodes of LCD cell. 1011 is a LC layer, including transmissive LC, e.g. TN, STN and scattering LC, e.g. PD-LC. 1012 is the black matrix. 1030 is the color filter. The black matrix 1012 and the color filter 1030 can be located at the inside surface or outside surface of the front plate 1004 or the back plate 1005.

In FIG. 10, 1003 is the gap between two adjacent LCD tiles. 1076 is the polished side walls; of the back plates 1005 of the two adjacent tiles. Between the side walls 1076, a transparent adhesive 1058 is filled. The refractive index of the adhesive 1058 is similar to the refractive index of the back plate 1005. 1077 is a soft black side wall of the LCD tile. The side wall 1077 is located at the top of the gap 1003 between the adjacent tiles. It can eliminate the leaking light from the backlight 1034 through the gap, and protect the LCD tiles from cracking, especially where the front plates 1004 are made of glass.

As shown in FIG. 10, the maximum angle θ is the critical angle of the material of the back plate 1005. 1040 is the light from the backlight with the maximum incident angle. In order to get a seamless tiled display, the following conditions should be satisfied:

$T_F \leq (M-H)/(2 \tan \theta)$, where $T_F$ is the thickness of the front plate 1004, M is the width of the black matrix 1012, H is the width of the gap 1003;

$W \leq (M-H)/2$, where W is the width of the sealing wall 1008;

$P \leq (M-H)/\tan \theta$, where P is the height of the soft side wall 1077.

From FIG. 10 we can see, if the thickness $T_B$ of the back plate 1005 is equal or less than $(M-H)/(2 \tan \theta)$, the transparent adhesive 1058 may be omitted in the gap 1003.

FIG. 11a shows a top view of the portion of another embodiment of a thin plastic LCD 1101, where the portion contains four pixels. FIG. 11b shows the cross-sectional view of the LCD. 1178 is one of the four pixels of the LCD, which can be a monochrome LCD or a color LCD which with R, G, B color filter. The thin front plate 1104 and the thin back plate 1105 of the LCD 1101 are plastic plates, e.g.

polyester or polycarbinate film. 1111 is the LC cell, including electrodes, alignment layer, black matrix, and color filter, where these components are not separately shown. The LCD 1101 can be a transmissive LCD, reflective LCD or scattering LCD. 1117 are the polarizers. 1118 is the spacer of LCD.

The plastic LCD 1101 is sealed by laser beam during LCD device laser cutting. Because the thin front plate 1104 and thin back plate 1105 will be melted during laser cutting, a thin sealing wall 1108 will be formed along the cutting edge. The width of the sealing wall 1108 can be range of 0.01 to 10 mm. In other words, the LCD 1101 may be made by first aligning the LC cells 1111 between two large thin sheets of plastic materials. A laser beam may be directed towards the sheets to cut them into smaller pieces such as the LCD 1101, where by cutting along lines that form the edges of the smaller piece 1101, also seals the front and back sheets together to form the side sealing walls 1108 of the LCD 1101.

The plastic LCD 1101 also can be riveted by laser beam to increase the strength of the plastic LCD. 1179 are rivets formed by laser beam. By directing a laser beam towards the LCD 1101 at selected locations to drill holes at, for example 1180, the plastic material around the hole will melt to form one of the rivets 1179 bonding the front and back plates together. 1181 is the wall of the hole 1180 formed during hole laser drilling. Thus, the embodiment of FIGS. 11a, 11b is particularly easier to make.

FIG. 12 shows an another embodiment of a riveted plastic LCD 1201 that is substantially the same as the embodiment of FIGS. 11a, 11b, except that, instead of through holes in the LCD, the drilling laser does not drill all the way through, so that the area occupied by the rivet subsequently formed can be made smaller. Furthermore, the rivets will not be visible by the viewer even at fine resolution. In this embodiment, the back plate 1205 is thinner than the front plate 1204. The front plate and the back plate can be plastic films, e.g. polyester or polycarbinate film. 1211 is the LC cell, including electrodes, alignment layer, black matrix, color filter and LC layer. The LCD 1201 can be a transmissive LCD, reflective LCD or scattering LCD. 1217 are the polarizers. 1218 is the spacer of LCD. 1208 is the sealing wall formed by laser cutting. The laser drilling is started from the back plate using a small diameter laser beam. The laser beam do not make a through hole, and the drilling is stopped when both the front and back plates 1204, 1205 are melted and attached together at a point to form a rivet 1279 as shown in FIG. 12 without puncturing the front plate. A transparent adhesive 1256 can be filled in the pit 1282 drilled and left by laser beam to improve the brightness uniformity of the image. This structure and process can be used for making the high resolution plastic LCD and large screen plastic LCD, including transmissive LCD and reflective LCD, and can be used for making mosaic LCD and single piece LCD.

To make an even sturdier sealing wall between the front and back plate of the LCD, after the LC cells have been placed are aligned onto one large thin sheet of plastic material, an adhesive material may be applied along lines marking the boundaries of the smaller pieces into which the sheet is to be cut and another large sheet of plastic material is placed on top so that the adhesive material will bond the two sheets with the LC cells aligned between the two sheets. A laser beam may then be directed towards the locations along the two large sheets that are bonded by the plastic material, so as to melt the adhesive material together with the plastic material of the two thin sheets, thereby cutting the two large sheets along the lines of the adhesive material into smaller pieces and thereby securely bonding the smaller pieces together at the edges by bonding the adhesive material together with portions of the two thin sheets so that they form one integral piece at the edges of the smaller pieces.

Although the invention has been described in detail in the foregoing for purpose of illustration, it is to be understood that such details are solely for the purpose and that variations that may be made therein by those skilled in the art without departing from the spirit and scope of the invention are described in the following claims.

What is claimed is:

1. A riveted liquid crystal display, which comprises:

a front plastic plate and a back plastic plate, with electrodes thereon, said plates aligned with each other; and at least one rivet is made by a laser beam to melt said front plate and said back plate to form the rivet, wherein said laser beam does not make a trough hole through the plates, and the laser beam is stopped when both the front and back plates are melted and attached together to form said rivet.

2. The device of claim 1, wherein said riveted liquid crystal display is formed in a transmissive liquid crystal display, reflective liquid crystal display or scattering liquid crystal display.

3. The device of claim 1, wherein said back plastic plate is thinner than said front plastic plate, and the rivet is formed by laser drilling starting from the back plate to the front plate using a small diameter laser beam.

4. The device of claim 1, wherein said front plastic plate and said back plate are made from one of the materials which include polyester or polycarbinate.

5. A riveted liquid crystal display, which comprises:

a front plate and a back plastic plate made of a plastic material, with electrodes thereon, said plates aligned with each other; and at least one rivet is made by a laser beam to melt said front plate and said back plate to form the rivet, wherein said laser beam makes a through hole through the plates, and said rivet is formed by melting said plastic material around the through hole which is formed by said laser beam.

6. The device of claim 5, wherein said riveted liquid crystal display is formed in a transmissive liquid crystal display, reflective liquid crystal display or scattering liquid crystal display.

7. The device of claim 5, wherein said rivet forms a thin sealing wall formed around the through hole.

8. The device of claim 5, wherein said back plate is thinner than said front plate, and the rivet is formed by laser drilling starting from the back plate through the front plate using a small diameter laser beam.

9. The device of claim 8, wherein said plastic material includes polyester or polycarbinate.

10. A method for making a riveted liquid crystal display, which comprises:

providing a front plate and a back plate comprising a plastic material, with electrodes formed thereon, and aligning said plates with each other; and laser drilling said front plate and said back plate to form at least one rivet attaching the front and back plates together, said laser drilling causing said plastic material to melt and form said at least one rivet without making a through hole through the plates, and wherein the laser drilling is stopped when the plates are melted and attached together.

11. A method for making a riveted liquid crystal display, which comprises:

providing a front plate and a back plate comprising a plastic material, with electrodes formed thereon, and aligning said plates with each other; and laser beam drilling said front plate and said back plate to form at least one rivet attaching the front and back plates together, said laser beam drilling causing said plastic material to melt and form a through hole through said plates, and wherein said plastic material melts around the through hole and forms the at least one rivet.

12. The method of claim 11, wherein said rivet forms a thin sealing wall around the through hole and attaches the plates together.

* * * * *